UNITED STATES PATENT OFFICE.

FRIEDRICH BOLEG, OF CANNSTATT, GERMANY, ASSIGNOR TO GESELLSCHAFT ZUR VERWERTUNG DER BOLEG'SCHEN WASSERLÖSLICHEN MINERALÖLE UND KOHLENWASSERSTOFFE, GESELLSCHAFT MIT BESCHRÄNKTER HAFTUNG, OF BERLIN, A CORPORATION OF GERMANY.

PROCESS FOR THE PREPARATION OF WATER-SOLUBLE HYDROCARBON DERIVATIVES.

No. 850,898.          Specification of Letters Patent.          Patented April 23, 1907.

Application filed March 8, 1904. Serial No. 197,170.

*To all whom it may concern:*

Be it known that I, FRIEDRICH BOLEG, chemist, a subject of the King of Würtemberg, residing at Cannstatt, in the Kingdom of Würtemberg, Germany, have invented a certain new and useful Improvement in Processes for the Preparation of Water-Soluble Hydrocarbon Derivatives; and I do hereby declare the following to be a full, clear, and exact description of the invention, such as will enable others skilled in the art to which it appertains to make and use the same.

The subject of the present invention consists of a process for the preparation of water-soluble or easily and permanently emulsifiable hydrocarbon derivatives, especially of aromatic hydrocarbons—such, for instance, as nitrobenzol, phenol, cresol, &c.

For the preparation of these hydrocarbon derivatives there are preferably used as the basis miscible or water-soluble mineral oils.

To render the mineral oils soluble in water, they are treated with crude rosin-oil and are then subjected to a washing and treatment with direct steam and caustic-soda solution in excess, whereupon the resutling alkaline mixture with oil after the separation of the rosin soap-lye is subjected to an oxidation process by the introduction of air under pressure or of ozone, and finally undergoes a shorter or longer treatment under a pressure of from one to one and a half atmospheres at temperatures which correspond to this steam-pressure. The method of obtaining these water-soluble oils is described more in detail in my application Serial No. 126,273.

The hydrocarbon derivatives are treated at a temperature of from 40° Celsius, rising slowly to 60° Celsius for about half an hour, with finely-divided air under pressure or ozone. At the same time for the purpose of saponifying the same so far as this is necessary and desirable two to five per cent. of caustic-soda solution of 20° Baumé in finely-divided condition is introduced, and to make up for the water evaporated about two per cent. more hot water is introduced. The hydrocarbon derivatives thus treated are then, according to the kind and quality, intimately mixed with the water-soluble mineral oil, which serves as a basis, and preferably with the further addition of air under pressure. The application of air under pressure is also again useful here in order to compensate for the oxygen escaping during the process from the oil mixture. Hereupon the preparation is cooled; but if it becomes cloudy it may be boiled for one-half to one hour at a pressure of one-half to one atmosphere, the product being cooled.

Instead of using water-soluble mineral oils water-soluble rosin-oils may be substituted as a basis for mixture with the treated hydrocarbon derivatives. The method of producing such oils may be briefly described as follows: The crude oil is boiled with an excess of caustic-soda solution and with the direct application of steam, after which the alkaline mixture containing the rosin-oil is subjected to treatment with air under pressure or ozone at a temperature of from 95° to 110° Celsius until a clear solution is obtained.

As a specific example of the application of the invention the preparation of water-soluble nitrobenzol may be given as follows: One hundred parts of crude nitrobenzol or sixty-five parts of rectified nitrobenzol are heated in the air-pressure apparatus to about 50° Celsius, about from two to five per cent. of soda-lye and a little water added, and the whole mixed intimately for from fifteen to twenty mintues by passing air through it. There is then added seventy to eighty parts of the water-soluble mineral or rosin oil heated to from 40° to 50° Celsius and allowed to flow in a thin stream and then heated to about 70° Celsius, after which the air-supply is shut off and the mixture allowed to cool.

The water contents of the added mineral or rosin oil is proportionate to the purpose of use in view and varies from fifteen to thirty per cent. The thirty or twenty per cent. nitrobenzol is specially intended for the purpose of soap-making. If it, for instance, is required also as a domestic disinfectant, then a weaker solution may be employed. It should be noted that it is only needful to use soda-lye when high-percentage compounds are to be produced.

What I claim, and desire to secure by Letters Patent, is—

1. The process of forming water-miscible products from immiscible hydrocarbon derivatives, which consists in incorporating the same with a water-soluble mineral oil.

2. The process of forming water-miscible products from immiscible hydrocarbon derivatives, which consists in air-blowing the same while in a heated state, and then incorporating the same with a water-soluble oil.

3. The process of making water-soluble hydrocarbon derivatives, which consists in oxidizing a hydrocarbon derivative by submitting it to the action of oxygen while in a heated state, mixing with a water-soluble oil under the influence of air under pressure, and heating.

4. The process of making water-soluble hydrocarbon derivatives, which consists in oxidizing a hydrocarbon derivative by submitting it to the action of oxygen while maintaining the same at a temperature of 40° to 60° Celsius, mixing with a water-soluble oil under the influence of air under pressure, and heating.

5. The process of making water-soluble hydrocarbon derivatives, which consists in adding to a hydrocarbon derivative finely-divided alkaline solution, subjecting to the action of finely-divided gaseous oxygen while maintaining the same at a temperature of 40° to 60° Celsius, and mixing with a water-soluble mineral oil by agitation with air under pressure while heated.

6. The process of making water-soluble hydrocarbon derivatives, which consists in adding to a hydrocarbon derivative two per cent. to five per cent. finely-divided caustic-soda solution, blowing into the same gaseous oxygen while maintaining a temperature of 40° to 60° Celsius, and mixing with seventy per cent. to eighty per cent. of a water-soluble mineral oil by agitation with air under pressure, while maintaining a temperature of approximately 70° Celsius.

7. The process of making water-soluble nitrobenzol which consists in adding to nitrobenzol two per cent. to five per cent. caustic-soda solution, agitating with gaseous oxygen under pressure while maintaining a temperature of about 50° Celsius, adding seventy per cent. to eighty per cent. of water-soluble mineral oil at a temperature of 40° to 50° Celsius, under agitation with air, and heating to a temperature of about 70° Celsius.

8. The process of making water-soluble hydrocarbon derivatives, which consists in oxidizing a hydrocarbon derivative by submitting it to the action of oxygen while maintaining the same at a temperature of 40° to 60° Celsius, mixing with a water-soluble oil under the influence of air under pressure, heating, and boiling.

9. The process of making water-soluble hydrocarbon derivatives, which consists in adding to a hydrocarbon derivative finely-divided gaseous oxygen while maintaining the same at a temperature of 40° to 60° Celsius, mixing with a water-soluble mineral oil by agitation with air under pressure while heated, and boiling under pressure.

10. The process of making water-soluble nitrobenzol which consists in adding to nitrobenzol two per cent. to five per cent. caustic-soda solution, agitating with gaseous oxygen under pressure while maintaining a temperature of about 50° Celsius, adding seventy per cent. to eighty per cent. of water-soluble mineral oil at a temperature of 40° to 50° Celsius, under agitation with air, heating to a temperature of about 70° Celsius, and boiling under a pressure of one-half to one atmosphere.

In witness whereof I have hereunto set my hand in presence of two witnesses.

FRIEDRICH BOLEG.

Witnesses:
ARTHUR VOGT,
RICHARD SELUNDEN.